(12) United States Patent
Horiguchi (10) Patent No.: US 9,843,791 B2
(45) Date of Patent: Dec. 12, 2017

(54) ELECTRO-OPTIC DEVICE AND STEREOSCOPIC VISION DISPLAY APPARATUS

(71) Applicant: SEIKO EPSON CORPORATION, Tokyo (JP)

(72) Inventor: Hirosada Horiguchi, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/401,551

(22) Filed: Jan. 9, 2017

(65) Prior Publication Data

US 2017/0118461 A1 Apr. 27, 2017

Related U.S. Application Data

(63) Continuation of application No. 13/204,822, filed on Aug. 8, 2011, now Pat. No. 9,577,794.

(30) Foreign Application Priority Data

Aug. 9, 2010 (JP) ................................. 2010-178385

(51) Int. Cl.
*H04N 13/04* (2006.01)
*G09G 3/36* (2006.01)
*G09G 3/34* (2006.01)

(52) U.S. Cl.
CPC ....... *H04N 13/0438* (2013.01); *G09G 3/3406* (2013.01); *G09G 3/3614* (2013.01);
(Continued)

(58) Field of Classification Search
None
See application file for complete search history.

(56) References Cited

U.S. PATENT DOCUMENTS 6,278,244 B1 * 8/2001 Hevinga ............ H05B 41/2888
315/209 R
6,448,952 B1 * 9/2002 Toyoda ................ G09G 3/3633
345/97

(Continued)

FOREIGN PATENT DOCUMENTS

CN 1181819 A 5/1998
CN 101320197 A 12/2008

(Continued)

*Primary Examiner* — James M Anderson, II
(74) *Attorney, Agent, or Firm* — Maschoff Brennan (57) ABSTRACT

An electro-optic device includes: an electro-optic panel displaying a display image with illumination light emitted from an illumination device; a display control circuit controlling the electro-optic panel to display a right-eye image during a right display period and display a left-eye image during a left display period; a glasses control circuit controlling a right-eye shutter of stereoscopic vision glasses so as to maintain an open state during the right display period, controlling a left-eye shutter of stereoscopic vision glasses so as to maintain an open state during the left display period, and controlling both the right-eye shutter and the left-eye shutter so as to maintain a close state during a blocking period; and an illumination control circuit controlling the illumination device to vary an intensity of the illumination light in a pulsed shape during the blocking period.

5 Claims, 6 Drawing Sheets (52) U.S. Cl.
  CPC ..... *H04N 13/0459* (2013.01); *H04N 13/0497* (2013.01); *G09G 2320/0233* (2013.01)

(56) References Cited

U.S. PATENT DOCUMENTS

| | | |
|---|---|---|
| 2008/0303962 A1 | 10/2008 | Tomita et al. |
| 2009/0179850 A1* | 7/2009 | Chen ................ G09G 3/003 345/102 |
| 2011/0019152 A1* | 1/2011 | Shestak ............. G03B 21/006 353/7 |
| 2011/0032345 A1 | 2/2011 | Robinson et al. |

FOREIGN PATENT DOCUMENTS

| | | |
|---|---|---|
| JP | 2002-533884 A | 10/2002 |
| JP | 2003-169346 A | 6/2003 |
| JP | 2005-353343 A | 12/2005 |
| JP | 2009-025436 A | 2/2009 |
| TW | 200931065 A | 7/2009 |
| WO | 1996-032665 A | 10/1996 |
| WO | 2000-038481 A | 6/2000 |
| WO | 2009084331 A1 | 7/2009 |

\* cited by examiner

PRIOR ART

FIG. 7

PRIOR ART

ELECTRO-OPTIC DEVICE AND STEREOSCOPIC VISION DISPLAY APPARATUS

CROSS-REFERENCE TO RELATED APPLICATIONS

This application is a Continuation of U.S. application Ser. No. 13/204,822, filed Aug. 8, 2011 which claims priority to Japanese Patent Application No. 2010-178385 filed on Aug. 9, 2010. The foregoing patent applications are incorporated herein by reference.

BACKGROUND

1. Technical Field

The present invention relates to a technique for displaying a right-eye image and a left-eye image mutually having parallax to provide a stereoscopic effect to an observer.

2. Related Art

Hitherto, display devices displaying an image using illumination light emitted from an illumination device have been suggested. For example, an illumination device using an alternating current driving type discharge lamp is used for a projection type display device displaying an image by projecting display light modulated in accordance with a display image on a projection surface. JP-T-2002-533884 and JP-A-2005-353343 disclose techniques for stabilizing lighting (discharging) by overlapping pulses P with an alternating driving current supplied to a discharge lamp, as shown in FIG. 6.

Figure 6:
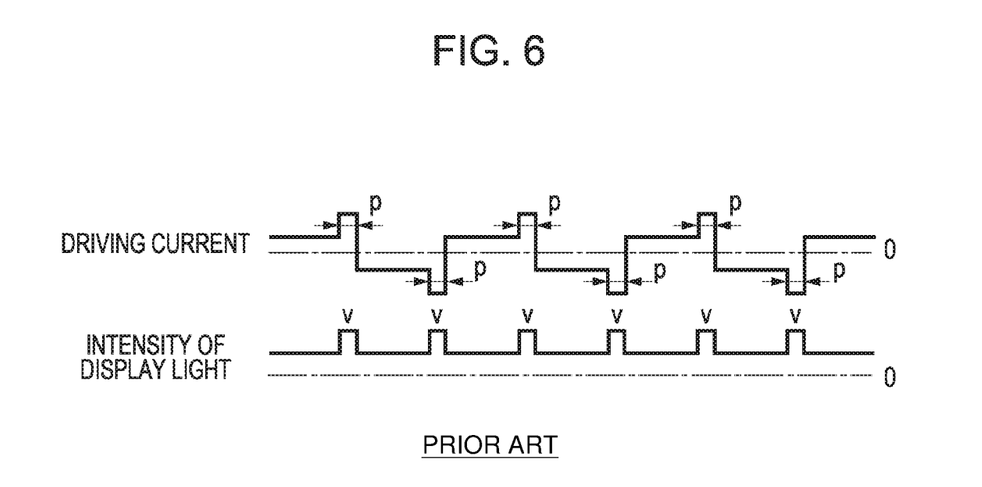
FIG. 6 is a diagram illustrating intensity variations of a driving current and display light of an illumination device according to the technique of the related art.

In the configuration disclosed in JP-T-2002-533884 and JP-A-2005-353343, in which the pulses P are overlapped with the driving current of the discharge lamp, as shown in FIG. 6, the intensity of display light (illumination light) emitted from the illumination device is varied (pulsated) at the time points of the pulses P. The instantaneous variation (hereinafter, referred to as "intensity variation") v of the display light causes deterioration (display spot) in display quality, as described below.

In the projection type display device, a plurality of pixels arranged in a matrix form is selected sequentially in a row unit and image signals corresponding to designated gray scales are supplied to the pixels of the selected rows and are maintained. The plurality of pixels each includes, for example, a transistor that controls a liquid crystal element. The electric characteristics (for example, the degree of current leak) of each transistor forming the pixel are varied in accordance with the intensity of illumination light.

Figure 7:
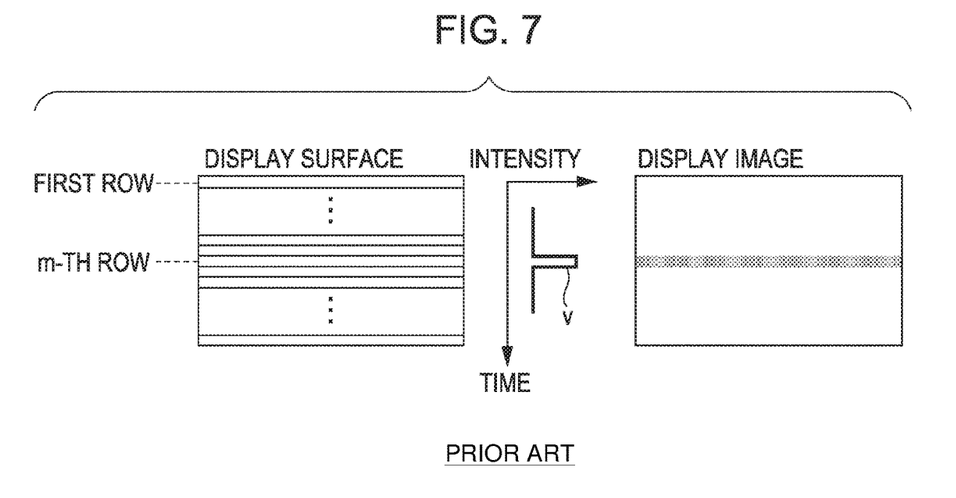
FIG. 7 is a diagram illustrating a problem (display spot) of a technique according to the related art.

As shown in FIG. 7, when the intensity variation v occurs in the display light from the illumination device during a horizontal scanning period of selecting the m-th row and, for example, even when the gray scale common to all the pixel circuits is designated, an error occurs between the voltage values of the image signal maintained in the respective pixels of the m-row and the image signal maintained in the respective pixels of the other rows. That is, an observer may recognize a horizontal line-shaped display spot (in the m-th row) where the gray scale is different from that of the periphery. Specifically, when the intensity variation v (overlap of the pulses P) and the vertical scanning of the projection type display device are synchronized with each other, the line-shaped display spot is normally located in a predetermined row (for example, the m-th row). When the intensity variation of the display light and the vertical scanning are not synchronized with each other, the line-shaped display spot is moved over time (so-called scroll noise).

In the above description, the intensity variation v of the display light has been exemplified to stabilize the discharge of the discharge lamp. However, the same problem may arise even when the intensity of the display line is made to be instantaneously varied (or inevitably varied) due to the reasons other than the stabilization of the discharge.

SUMMARY

An advantage of some aspects of the invention is that it provides a technique for suppressing deterioration (display spot) in display quality caused due to an instantaneous variation in the intensity of the display light.

According to an aspect of the invention, there is provided an electro-optic device which displays a right-eye image and a left-eye image stereoscopically viewed with stereoscopic vision glasses including a right-eye shutter and a left-eye shutter. The electro-optic device includes: an electro-optic panel displaying a display image with illumination light emitted from an illumination device; a display control circuit controlling the electro-optic panel to display the right-eye image during a right display period and display the left-eye image during a left display period; a glasses control circuit controlling the right-eye shutter so as to maintain an open state during the right display period, controlling the left-eye shutter so as to maintain an open state during the left display period, and controlling both the right-eye shutter and the left-eye shutter so as to maintain a close state during a blocking period different from the right display period and the left display period; and an illumination control circuit controlling the illumination device to emit the illumination light (for example, illumination light in which an intensity is maintained normally) during the right display period and the left display period and to vary an intensity of the illumination light in a pulsed shape during the blocking period.

With such a configuration, since the intensity variation (variation in a pulsed shape) occurs during the blocking period in which both the right-eye shutter and the left-eye shutter are controlled so as to maintain the close state, it is possible to obtain the advantage that an observer can scarcely perceive a deterioration (display spot) in display quality caused to the intensity variation of the illumination light.

In the electro-optic device according to the aspect of the invention, the display control circuit may control the electro-optic panel so that the display image of the electro-optic panel is changed from the left-eye image to the right-eye image during the blocking period before start of the right display period and the display image of the electro-optic panel is changed from the right-eye image to the left-eye image during the blocking period before start of the left display period. With such a configuration, since one of the right-eye image and the left-eye image is changed to the other thereof during the blocking period in which both the right-eye shutter and the left-eye shutter are controlled so as to maintain the close state, it is possible to obtain the advantage that an observer can scarcely perceive coexistence (crosstalk) of the right-eye image and the left-eye image.

The electro-optic device according to the aspect of the invention may further include a pixel section in which a plurality of pixel circuits including a liquid crystal element are arranged. The display control circuit may control the electro-optic panel so that an application voltage to each liquid crystal element becomes reverse in polarity between time of displaying the right-eye image during the right display period and time of displaying the right-eye image during the blocking period immediately before this right display period and so that the application voltage to each liquid crystal element becomes reverse in polarity between time of displaying the left-eye image during the left display period and time of displaying the left-eye image during the blocking period immediately before this left display period. With such a configuration, since the application voltage of each liquid crystal element is set to become reverse in polarity during the blocking period and during the right display period or the left display period, it is possible to prevent liquid crystal from deteriorating due to application of a direct-current component.

The electro-optic device according to the above aspect is used as a display unit for various electronic apparatuses. For example, a stereoscopic vision display apparatus, which includes the electronic apparatus according to the above aspect of the invention, stereoscopic vision glasses controlled by the glass control circuit of the electro-optic device; and an illumination device controlled by the illumination control circuit, is exemplified as an electronic apparatus according to another aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
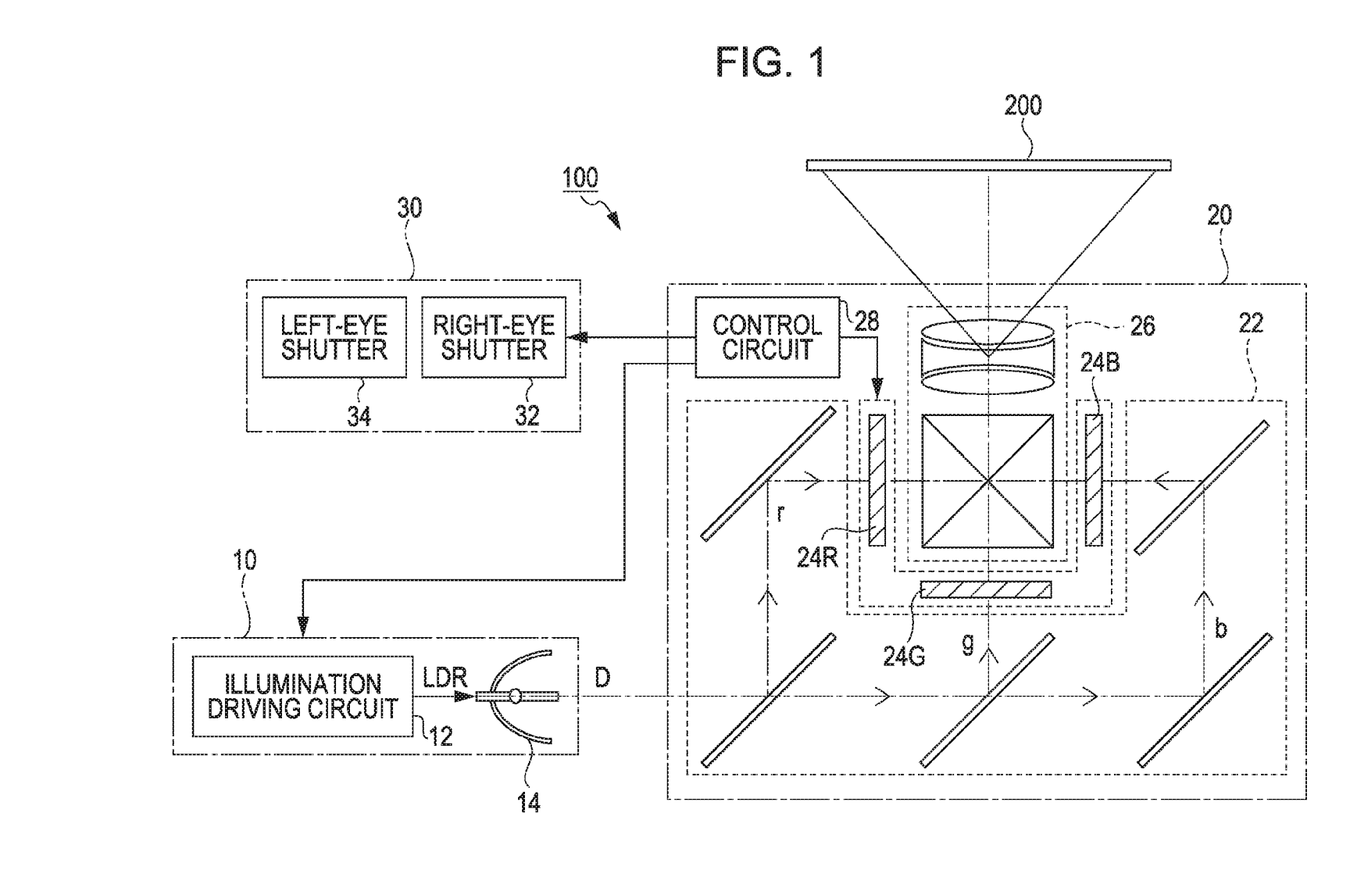
FIG. 1 is a diagram illustrating the configuration of a stereoscopic vision display apparatus according to a first embodiment.

FIG. 1 is a block diagram illustrating a stereoscopic vision display apparatus 100 according to a first embodiment of the invention. The stereoscopic vision display apparatus 100 according to the first embodiment is an electronic apparatus that displays a stereoscopic image configured to provide a stereoscopic effect to an observer in accordance with an active shutter method. As shown in FIG. 1, the stereoscopic vision display apparatus 100 includes an illumination device 10, an electro-optic device 20, and stereoscopic vision glasses 30. The illumination device 10 and the electro-optic device 20 may be accommodated in a single casing (not shown).

The illumination device 10 is an illuminator that emits display light (illumination light) D used to display a stereoscopic image. The illumination device 10 includes an illumination driving circuit 12 and a light source 14. The light source 14 emits the display light D. For example, an alternating driving type discharge lamp such as a UHP (Ultra High Performance) lamp is suitably used as the light source 14. The illumination driving circuit 12 allows the light source 14 to emit light by supplying an alternating driving current LDR. For example, a full bridge type inverter circuit that generates the driving current LDR from a direct-current power source is used as the illumination driving circuit 12. The electro-optic device 20 displays a stereoscopic vision image (color image) by modulating the display light D from the illumination device 10 and projecting the modulated display light D onto a projection surface (screen) 200.

The stereoscopic vision glasses 30 in FIG. 1 is a glasses-type instrument which an observer wears when viewing the stereoscopic vision image displayed by the electro-optic device 20. The stereoscopic vision glasses 30 includes a right-eye shutter 32 located on the front side of the right eye of the observer and a left-eye shutter 34 located on the front side of the left eye of the observer. The right-eye shutter 32 and the left-eye shutter 34 are controlled in accordance with an open state where the illumination light passes and a close state where the illumination light is blocked. For example, a liquid crystal shutter, in which one of the open state and the close state is changed to the other in accordance with an alignment direction of liquid crystal by an application voltage, can be used as the right-eye shutter 32 and the left-eye shutter 34.

The electro-optic device 20 is a projection type display device (projector) that includes an illumination optical system 22, a plurality of electro-optic panels 24 (24R, 24G, and 24B), a projection optical system 26, and a control circuit 28. The illumination optical system 22 supplies the display light D emitted from the illumination device 10 to the respective electro-optic panels 24. Specifically, a red component r of the display light D is supplied to the electro-optic panel 24R, a green component g thereof is supplied to the electro-optic panel 24G, and a blue component b thereof is supplied to the electro-optic panel 24B. Each electro-optic panel 24 is an optical modulator (light valve) that modulates the display light D (each monochromatic light) in accordance with the display image. The projection optical system 26 synthesizes the light emitted from the respective electro-optic panels 24 and projects the synthesized light onto the projection surface 200. The control circuit 28 controls each unit (the illumination device 10, the electro-optic device 20, and the stereoscopic vision glasses 30) of the stereoscopic vision display apparatus 100.

Figure 2:
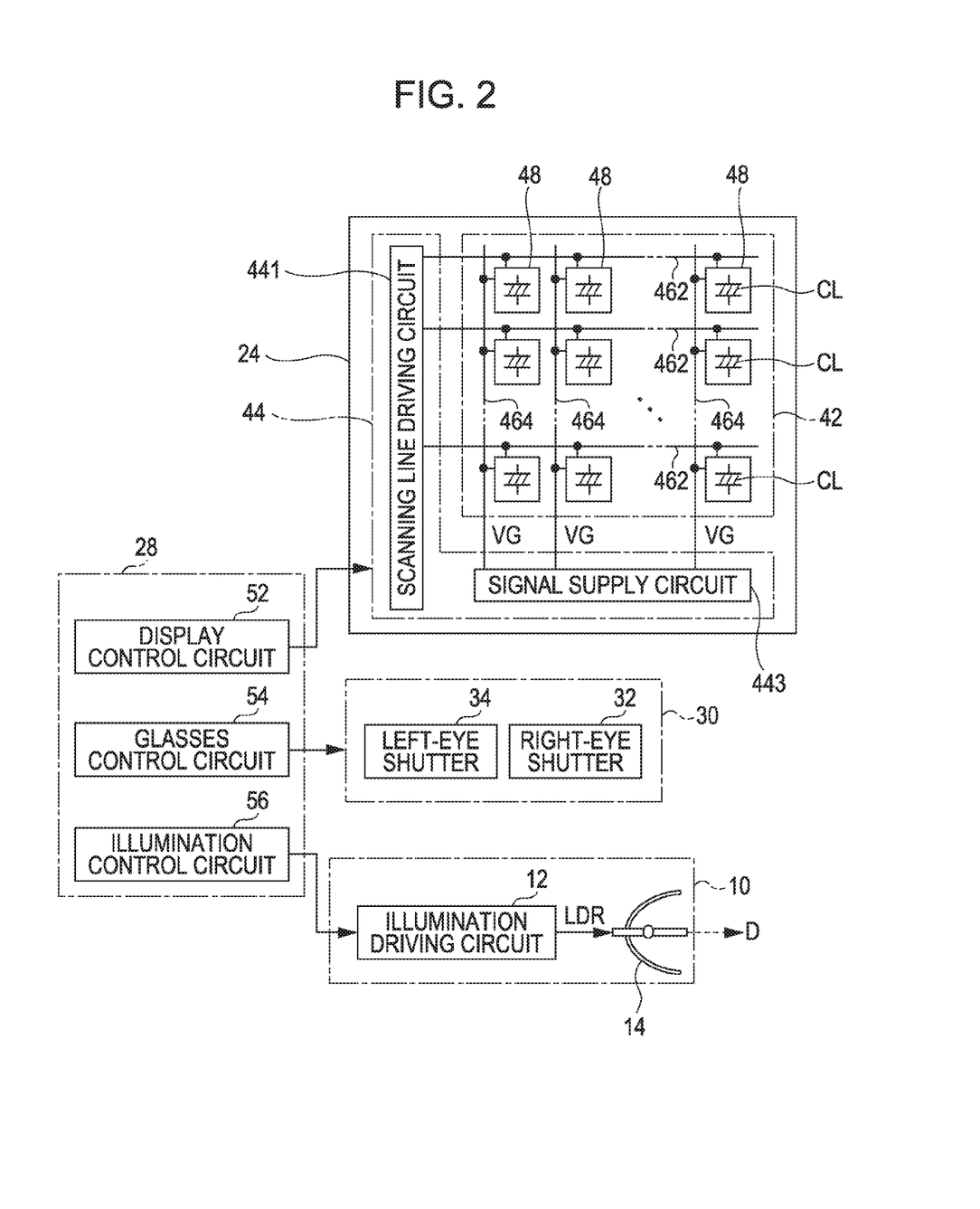
FIG. 2 is a diagram illustrating another configuration of the stereoscopic vision display apparatus.

FIG. 2 is a block diagram illustrating the electric configuration of the stereoscopic vision display apparatus 100. In FIG. 2, the representative electro-optic panel 24 is illustrated among the plurality of electro-optic panels 24 (24R, 24G, and 24B) of the electro-optic device 20. Since the general configuration and operation of each electro-optic panel 24 is common, the configuration and the operation of one electro-optic panel 24 will be mainly described below.

The electro-optic panel 24 includes a pixel section 42, in which a plurality of pixel circuits 48 is arranged in a matrix form in correspondence with intersections between a plurality of scanning lines 462 and a plurality of signal lines 464, and a driving circuit 44 which drives the respective pixel circuits 48. The driving circuit 44 includes a scanning line driving circuit 441 which selects the plurality of scanning lines 462 in order and a signal supply circuit 443 which supplies a gray scale potential VG to the plurality of signal lines 464 in synchronization with the selection of the respective scanning lines 462. The gray scale potential VG is set to be variable in accordance with gray scales (that is, each pixel value of the display image) designated with the image signal supplied from an external circuit. Each pixel circuit 48 includes a liquid crystal element CL of which transmittance is varied in accordance with the voltage between both ends. The application voltage to the liquid crystal element CL is set in accordance with the gray scale potential VG supplied to the signal lines 464 at the time of selecting the scanning lines 462.

As shown in FIG. 2, the control circuit 28 includes a display control circuit 52 which controls each electro-optic panel 24, a glasses control circuit 54 which controls the stereoscopic vision glasses 30, and an illumination control circuit 56 which controls the illumination device 10. Further, the display control circuit 52, the glasses control circuit 54, and the illumination control circuit 56 may be mounted on a single integrated circuit. Alternatively, the display control circuit 52, the glasses control circuit 54, and the illumination control circuit 56 may be mounted on separate integrated circuits. Hereinafter, a specific operation of the control circuit 28 will be described with reference to FIG. 3.

Figure 3:
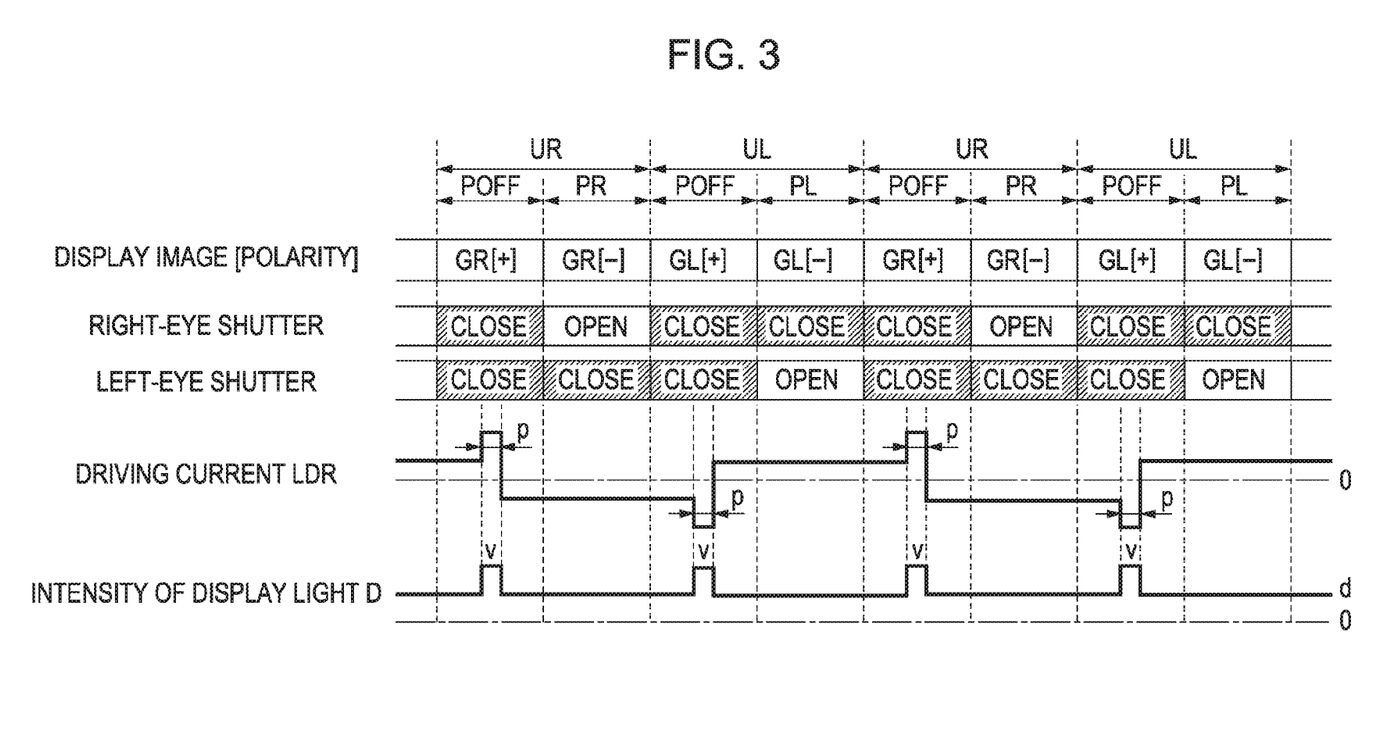
FIG. 3 is a diagram illustrating an operation of the stereoscopic vision display apparatus.

The display control circuit 52 displays a right-eye image GR and a left-eye image GL having mutually parallax in a time division manner on the projection surface 200 by controlling each electro-optic panel 24. As shown in FIG. 3, an operation period of the electro-optic panel 24 is divided into a plurality of unit periods U (UR and UL). The unit period UR of displaying the right-eye image GR and the unit period UL of displaying the left-eye image GL are alternately set. The unit period UR includes a blocking period POFF and a right display period PR. The blocking period POFF is located before (immediately before) the right display period PR starts. Likewise, the unit period UL includes a blocking period POFF and a left display period PL immediately after the blocking period POFF.

The display control circuit 52 shown in FIG. 2 controls each electro-optic panel 24 so as to display the right-eye image GR during each of the blocking period POFF and the right display period PR of each unit period UR. That is, the scanning driving circuit 441 selects the plurality of scanning lines 462 sequentially in order during each blocking period POFF and each right display period PR and the signal supply circuit 443 supplies the gray scale potential VG corresponding to the right-eye image GR to the respective signal lines 464. In this case, the display control circuit 52 controls the driving circuit 44 so that the polarity of the application voltage to the liquid crystal element CL of each pixel circuit 48 becomes reverse during the blocking period POFF and the right display period PR of one unit period UR. That is, the signal supply circuit 443 supplies the gray scale potential VG with a positive polarity (sign [+] in FIG. 3) relative to a predetermined reference potential (for example, the potential of a counter electrode) to the respective signal lines 464 during the blocking period POFF, whereas the signal supply circuit 443 supplies the gray scale potential VG with a negative polarity (sign [−] in FIG. 3) relative to the reference potential during the right display period PR. The common right-eye image GR is displayed during each blocking period POFF and each right display period PR. However, the separate right-eye images GR (images of previous and subsequent frames) may be displayed during the blocking period POFF and the right display period PR.

Likewise, the display control circuit 52 allows the electro-optic panel 24 to display the left-eye image GL during the blocking period POFF and the left display period PL of each unit period UL. Like the operation during the unit period UR, the polarity of the application voltage (the gray scale potential VG) to the liquid crystal element CL of each pixel circuit 48 is set to be reverse during the blocking period POFF and the left display period PL of one unit period UL. Since the polarity of the application voltage to the liquid crystal element CL sequentially becomes reverse (AC-drive), the deterioration in the liquid crystal caused due to application of the direct-current voltage is suppressed.

During the blocking period POFF of the unit period UR, the left-eye image GL displayed during the left display period PL of the immediately previous unit period UL is changed to the right-eye image GR sequentially in the row unit. During the blocking period POFF of the unit period UL, the right-eye image GR displayed during the right display period PR of the immediately previous unit period UR is changed to the left-eye image GL sequentially in the row unit. That is, during each blocking period POFF, the right-eye image GR and the left-eye image GL coexist.

The glasses control circuit 54 shown in FIG. 2 controls the states (the open state and the close state) of the right-eye shutter 32 and the left-eye shutter 34 of the stereoscopic vision glasses 30 in synchronization with the operation of the electro-optic panel 24. Specifically, during the right display period PR of each unit period UR, the glasses control circuit 54 controls the open state of the right-eye shutter 32 and also controls the close state of the left-eye shutter 34. During the left-display period PL of each unit period UL, the glasses control circuit 54 controls the close state of the right-eye shutter 32 and also controls the open state of the left-eye shutter 34. Accordingly, the right-eye image GR displayed during the right display period PR passes through the right-eye shutter 32 and reaches the right eye of the observer, whereas being blocked by the left-eye shutter 34. The left-eye image GL displayed during the left display period PL passes through the left-eye shutter 34 and reaches the left eye of the observer, whereas being blocked by the right-eye shutter 32. The observer can perceive the stereoscopic effect of the display image when viewing the right-eye image GR having passed through the right-eye shutter 32 with his or her right eye and also viewing the left-eye image GL having passed through the left-eye shutter 34 with his or her left eye.

The glasses control circuit 54 controls the close states of both the right-eye shutter 32 and the left-eye shutter 34 during the blocking period POFF of each unit period U (UR and UL). During the blocking period POFF, the display image is changed over time from one of the right-eye image GR and the left-eye image GL to the other, as described above, but both the right-eye shutter 32 and the left-eye shutter 34 are controlled in the close state. Therefore, during the blocking period POFF, the observer is not able to perceive the coexistence (crosstalk) of the right-eye image GR and the left-eye image GL. That is, since the right-eye image GR and the left-eye image GL are reliably separated for the right eye and the left eye, respectively, the observer is able to clearly perceive the stereoscopic effect.

The illumination control circuit 56 shown in FIG. 2 controls the illumination device 10 to generate the display light D in synchronization with the operation of the electro-optic panel 24. Specifically, as shown in FIG. 3, the illumination control circuit 56 controls the illumination driving circuit 12 to supply an alternating driving current LDR periodically overlapped with the pulses P from the illumination driving circuit 12 to the light source 14. In this way, it is possible to stabilize lighting (discharging) of the light source 14 by overlapping the driving current LDR with the pulses P. As shown in FIG. 3, an instantaneous variation (intensity variation) v in the intensity occurs in the display light D emitted from the illumination device 10 at the time point of the pulse P overlapped with the driving current LDR.

As shown in FIG. 3, the illumination control circuit 56 controls the illumination driving circuit 12 so that the pulses P are overlapped only during the blocking period POFF of each unit period U (UR and UL) (that is, no pulse p exists during the right display period PR or the left display period PL). Accordingly, the intensity variation v of the display light D caused due to the pulse p of the driving current LDR occurs during the blocking period POFF of each unit period U (UR and UL). That is, the intensity (intensity d in FIG. 3) of the display light emitted from the illumination device 10 is maintained substantially constantly during each right display period PR or each left display period PL and increases in a pulse shape during each blocking period POFF. As described above, both the right-eye shutter 32 and the left-eye shutter 34 are controlled in the close state during each blocking period POFF. Accordingly, the observer is not able to perceive the horizontal line-shaped display spot (see FIG. 7) which can occur in the display image during the blocking period POFF due to the intensity variation v of the display light D. That is, according to the first embodiment, even in the configuration in which the pulses p are overlapped with the driving current LDR to stabilize the display light D, it is possible to obtain the advantage of effectively suppressing the deterioration (display spot) in the display quality caused due to the intensity variation v of the display light D.

B. Second Embodiment

Next, a second embodiment of the invention will be described. The same reference numerals are given to the constituent elements having the same operations and functions as those of the first embodiment and the description thereof will not be repeated.

Figure 4:
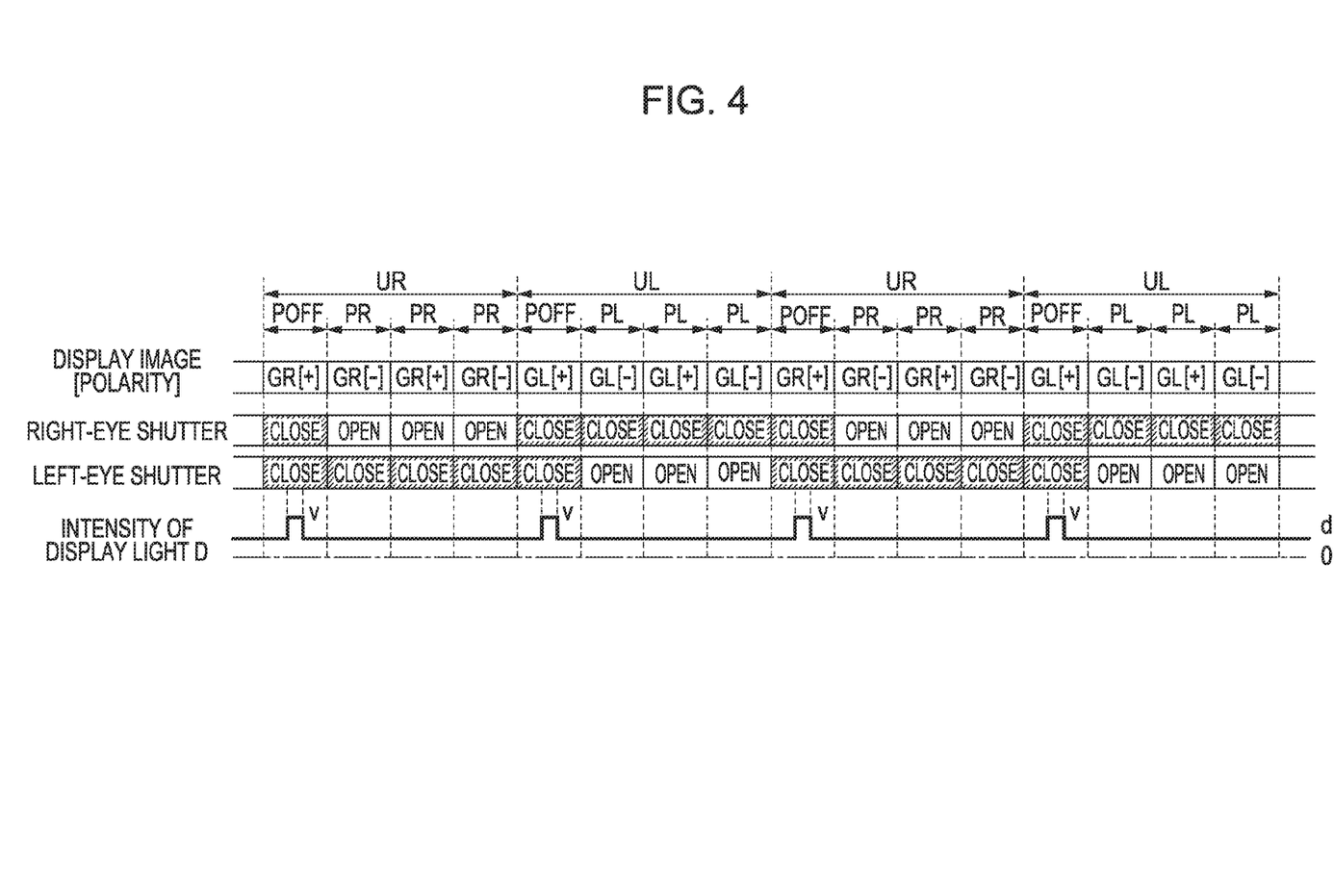
FIG. 4 is a diagram illustrating an operation of the stereoscopic vision display apparatus according to a second embodiment.

FIG. 4 is a diagram illustrating the operation of the control circuit 28. As shown in FIG. 4, each unit period UR includes one blocking period POFF and the plurality of right display periods PR. Likewise, each unit period UL includes one blocking period POFF and the plurality of left display periods PL. The control circuit 52 controls each electro-optic panel 24 so that the application voltage of the liquid crystal element CL becomes reverse during the previous and subsequent right display periods PR of each unit period UR and the application voltage of the liquid crystal element CL becomes reverse during the previous and subsequent left display periods PL of each unit period UL. Further, during each of the previous and subsequent right display periods PR, the common right-eye image GR may be display or the separate right-eye images GR (for example, images of previous and subsequent frames). The same is applied to the left display period PL.

As shown in FIG. 4, the glasses control circuit 54 controls the right-eye shutter 32 so as to maintain the open state and the left-eye shutter 34 so as to be maintained in the close state continuously during the plurality of right display periods PR of the unit period UR, whereas the glasses control circuit 54 controls the left-eye shutter 34 so as to maintain the open state and the right-eye shutter 32 so as to be maintained in the close state continuously during the plurality of left display periods PL of the unit period UL. Further, as in the first embodiment, the glasses control circuit 54 controls the right-eye shutter 32 and the left-eye shutter 34 so as to be maintained in the close state during the blocking period POFF of each unit period U (UR and UL).

As in the first embodiment, the illumination control circuit 56 controls the illumination device 10 (the illumination driving circuit 12) so that the intensity variation v of the display light D caused by the pulse P of the driving current LDR occurs during the blocking period POFF of each unit period U (UR and UL). Thus, since the intensity variation v of the display light D occurs during the blocking period POFF in which the right-eye shutter 32 and the left-eye shutter 34 are in the close state, it is possible to suppress the deterioration (display spot) in the display quality caused due to the intensity variation v, as in the first embodiment. Further, in the second embodiment, one unit period UR includes the plurality of right display periods PR and one unit period UL also includes the plurality of left display periods PL. With such a configuration, since the ratio of the blocking period POFF of each unit period U (UR and UL) is reduced, it is possible to easily ensure the brightness of the display image compared to, for example, a case where the blocking period POFF occupies about half of the unit period U.

C. Modifications

The above-described embodiments may be modified in various forms. Specific modifications will be described. Two or more arbitrarily selected modifications among the modifications described below may be combined appropriately.

Figure 5A:
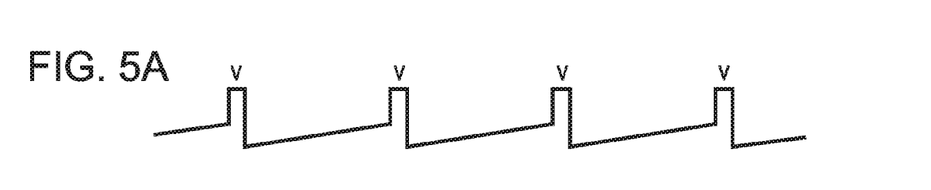
FIGS. 5A and 5B are diagrams illustrating an intensity variation of display light of an illumination device according to a modification.
Figure 5B:
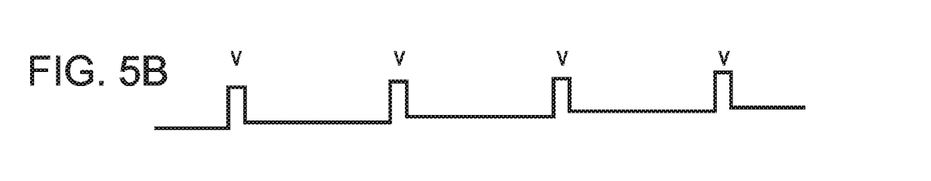

(1) Modification 1: in the above-described embodiments, the configuration has been exemplified in which the intensity of the display light D is instantaneously varied during the blocking period POFF and is maintained so as to be substantially constant during the other periods (for example, the right display periods PR or the left display periods PL), but the invention is not limited to the above-described example of the intensity variation of the display light D. For example, as shown in FIGS. 5A and 5B, the intensity of the display light D may be varied over time during a period other than the intensity variation v caused due to the pulses P of the driving current LDR. In the above-described embodiments, the configuration has been exemplified in which the intensity of the display light D instantaneously increases. However, a configuration in which the intensity of the display light D instantaneously decreases is applicable to the above-described embodiments. For example, when the intensity of the display light D instantaneously decreases in order to reduce the power consumption of the illumination device 10, the configuration is suitably used in which the intensity of the display light D instantaneously decreases during the blocking period POFF. As described above, the illumination control circuit 56 in the above-described embodiments serves as an element that controls the illumination device 10 so that pulse-shaped intensity variation v of the display light D occurs during the blocking period POFF. Moreover, the direction (increase/decrease) of the intensity variation of the display light D or the purpose (stabilization of the discharge or reduction in the power consumption) for the intensity variation of the display light during the blocking period POFF can be arbitrarily determined.

(2) Modification 2: in the above-described embodiments, the plurality of scanning lines 462 are each selected sequentially even during the blocking period POFF like the right display period PR or the left display period PL, and the gray scale potential VG corresponding to the display image is supplied to each pixel circuit 48. However, the operation of the electro-optic panel 24 during the blocking period POFF is not limited to the above-described example. For example, N (where N is a natural number of 2 or more) scanning lines may be selected among the plurality of scanning lines 462 and the gray scale potential VG corresponding to the display image may be supplied to each pixel circuit 48. According to the above configuration, it is possible to prevent the right-eye image GR and the left-eye image GL from coexisting while shortening the time length of the blocking period POFF by 1/N. In the above-described embodiments, the blocking period POFF is set in order to prevent the right-eye image GR and the left-eye image GL from coexisting, but the purpose of setting the blocking POFF is not limited to the above example. For example, the blocking period POFF may be set only for the purpose of allowing the observer not to perceive the intensity variation v of the display light D. As described above, the blocking period POFF is a period other than the right display period PR and the left display period PL. The operation of changing one of the right-eye image GR and the left-eye image GL during the blocking period POFF to the other is not compulsory.

(3) Modification 3: in the above-described embodiments, a period at which the polarity of the application voltage of the liquid crystal element CL becomes reverse can be set arbitrarily. For example, the polarity of the application voltage of the liquid crystal element CL becomes reverse at an interval of the unit period U (UR and UL). Alternatively, the polarity of the application voltage of the liquid crystal element CL may become reverse at an interval of the plurality of unit periods U.

(4) Modification 4: in the above-described embodiments, the electro-optic element used for modulating the display light D from the illumination device 10 is not limited to the liquid crystal element CL exemplified in the above-described embodiments. For example, an electrophoretic element may be used as the electro-optic element. That is, the electro-optic element serves as a display element which is varied in optical characteristics (for example, transmittance) in accordance with an electric operation (for example, application of voltage).

(5) Modification 5: in the above-described embodiments, a projection type display device has been exemplified so that an observer can perceive the reflected light from the projection surface 200. However, the invention is applicable to a direct-view type display device with which an observer can directly perceive emitted light. In the direct-view type display device, the illumination device 10 is used as a backlight unit or a front-light unit that illuminates a single electro-optic panel 24. The direct-view type display device to which the invention is applied may be used for various electronic apparatuses such as cellular phones or a portable information terminals.

The entire disclosure of Japanese Patent Application No. 2010-178385, filed Aug. 9, 2010 is expressly incorporated by reference herein.

What is claimed is:

1. An electro-optic device which displays a right-eye image and a left-eye image stereoscopically viewed with stereoscopic vision glasses including a right-eye shutter and a left-eye shutter, comprising:
an electro-optic panel displaying a display image with illumination light emitted from an illumination device;
a display control circuit controlling the electro-optic panel to display the right-eye image during a first unit period and display the left-eye image during a second unit period, the first unit period and the second unit period being alternately set;
a glasses control circuit controlling the right-eye shutter so as to maintain an open state during a right display period in the first unit period, controlling the left-eye shutter so as to maintain an open state during a left display period in the second unit period, and controlling both the right-eye shutter and the left-eye shutter so as to maintain a close state during a blocking period in the first unit period and the second unit period, the blocking period being a period when both the right-eye shutter and the left-eye shutter are in the closed state; and
an illumination control circuit controlling the illumination device to emit the illumination light during the first unit period and the second unit period and to vary an intensity of the illumination light during the blocking period,
wherein the illumination light includes a first intensity and a peak in intensity having higher than the first intensity, and the peak in intensity overlaps with the blocking period.

2. The electro-optic device according to claim 1, wherein the display control circuit controls the electro-optic panel so that the display image of the electro-optic panel is changed from the left-eye image to the right-eye image during the blocking period before start of the right display period, and the display image of the electro-optic panel is changed from the right-eye image to the left-eye image during the blocking period before start of the left display period.

3. The electro-optic device according to claim 2, further comprising:
a pixel section in which a plurality of pixel circuits including a liquid crystal element are arranged,
wherein the display control circuit controls the electro-optic panel so that an application voltage to each liquid crystal element becomes reverse in polarity between time of displaying the right-eye image during the right display period and time of displaying the right-eye image during the blocking period immediately before this right display period, and so that the application voltage to each liquid crystal element becomes reverse in polarity between time of displaying the left-eye image during the left display period and time of displaying the left-eye image during the blocking period immediately before this left display period.

4. The electro-optic device according to claim 1, wherein:
a polarity of a driving current supplied to a light source alternates during the blocking period, such that the polarity of the driving current of the light source in the right display period is different from the polarity of the driving current of the light source in the left display period.

5. A stereoscopic vision display apparatus comprising:
the electro-optic device according to claim 1;
stereoscopic vision glasses controlled by the glass control circuit of the electro-optic device; and
and an illumination device controlled by the illumination control circuit of the electro-optic device.

* * * * *